W. A. WALLET & I. HARBAUGH.
Improvement in Pruning Shears.
No. 115,995.                             Patented June 13, 1871.
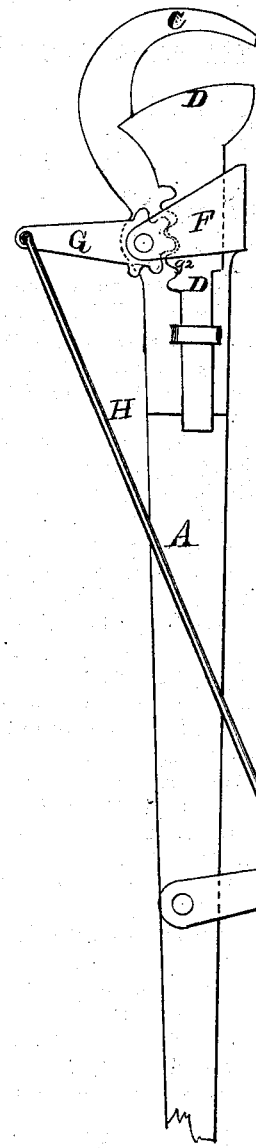
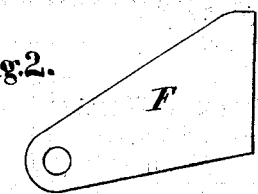
Fig.2.
Fig.3.
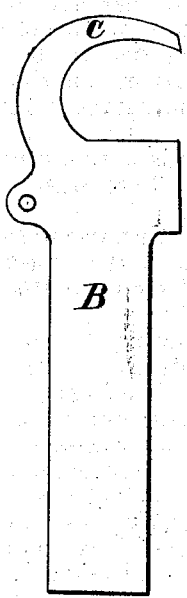
Fig.4.
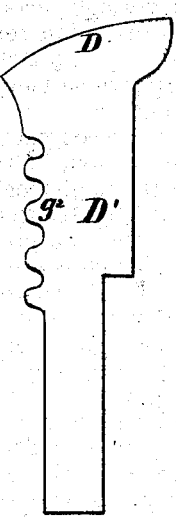
Fig.5.
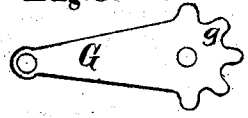
Witnesses.
Cha. Kenyon
F. B. Curtis
Inventor.
W. A. Wallet,
I. Harbaugh,
Chipman Hosmer & Co.
Attys.

UNITED STATES PATENT OFFICE.

WILLIAM A. WALLET AND ISAAC HARBAUGH, OF WEST SALEM, OHIO.

IMPROVEMENT IN PRUNING-SHEARS.

Specification forming part of Letters Patent No. 115,995, dated June 13, 1871.

*To all whom it may concern:*

Be it known that we, WILLIAM A. WALLET and ISAAC HARBAUGH, of West Salem, in the county of Wayne and State of Ohio, have invented a new and valuable Improvement in Pruning-Shears; and we do hereby declare that the following is a full, clear, and exact description of the construction and operation of the same, reference being had to the annexed drawing making a part of this specification, and to the letters and figures of reference marked thereon.

Figure 1 of the drawing is a side view of our invention. Figs. 2 and 3 are side views of the various parts thereof.

This invention relates to certain improvements in pruning-shears, with the object of rendering them more useful for the purposes intended.

In the accompanying drawing illustrating this invention, A represents the handle by which the implement is held in using it. B is a metallic plate, secured to the upper part of said handle, and provided with a hook, C, one side of which is rounded and the other side made flat. D represents a knife, with its cutting-edge curved in a direction corresponding to that of the interior curve of the hook C, in connection with which it acts. This knife is constructed with a long shank, D', which is made to slide vertically within guides E F, attached to the plate B. The plate B and the guide F are provided with corresponding eyes, in which is pivoted the lever G, which lies between them. This lever is provided with a semicircular row of teeth, $g$, which engage with the teeth $g^2$ formed on the opposite edge of the plate D' from the lever H' pivoted to the lower part of the handle A. H represents a rod, which connects the lever G with the lever H', and which is designed to extend across the handle in an oblique direction between these two levers, which are arranged on opposite sides of the said handle.

The movement of the lever H' operates the knife in a vertical direction, and any branch may be easily severed between the concave cutting-edge of the hook C and the oblique convex cutting-edge of the knife D. The object of placing the lever G on the opposite side of the handle A from the lever H' is to get it out of the way from between the eye of the operator and the shears; also, to strengthen the power of the shears by placing the toothed segment of the lever G as near to the knife D as possible. It is also designed, in reference to the slant of the cutting-edge of the knife D, to prevent undue friction betweeen the teeth $g$ and $g^2$. Further, there will be but little space between the rod H and the handle A for the entanglement of twigs and foliage when operating, as is usually the case, on trees of exuberant growth.

Having described our invention, we claim—

The arrangement of the hook C, knife D with toothed shank D', guides E and F, toothed lever G, rod H, lever H', and handle A, substantially as and for the purpose set forth.

In testimony that we claim the above we have hereunto subscribed our names in the presence of two witnesses.

WILLIAM A. WALLET.
ISAAC HARBAUGH.

Witnesses:
JOHN HOSLER,
HERVEY W. MORRS.